US010129907B2

(12) United States Patent
Ho

(10) Patent No.: US 10,129,907 B2
(45) Date of Patent: Nov. 13, 2018

(54) IMPLANT ACCESS IN THE MEDICAL IMPLANT COMMUNICATIONS SERVICE BAND

(71) Applicant: TEXAS INSTRUMENTS INCORPORATED, Dallas, TX (US)

(72) Inventor: Jin-Meng Ho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/666,732

(22) Filed: Aug. 2, 2017

(65) Prior Publication Data

US 2017/0332402 A1 Nov. 16, 2017

Related U.S. Application Data

(60) Continuation of application No. 14/567,410, filed on Dec. 11, 2014, now Pat. No. 9,756,661, which is a
(Continued)

(51) Int. Cl.
*H04B 7/00* (2006.01)
*H04W 74/06* (2009.01)
(Continued)

(52) U.S. Cl.
CPC ............ *H04W 74/06* (2013.01); *H04J 3/1682* (2013.01); *H04L 67/12* (2013.01)

(58) Field of Classification Search
CPC ..... H04W 24/00; H04W 80/04; H04W 84/12; H04W 88/06; H04W 88/08; H04W 84/18;
(Continued)

(56) References Cited

U.S. PATENT DOCUMENTS 5,539,396 A 7/1996 Mori et al.
7,065,376 B2 * 6/2006 Wolman .................. H04L 29/06
370/310
(Continued)

OTHER PUBLICATIONS

Davenport, MedWiN MAC and Security Protocol—Documentation, IEEE P802.15, Sep. 22, 2009.

*Primary Examiner* — Brenda H Pham
(74) *Attorney, Agent, or Firm* — Tuenlap D. Chan; Charles A. Brill; Frank D. Cimino

(57) ABSTRACT

A system and method for providing communications between a hub (medical controller) and a node (an implant) are disclosed. The hub selects an operating channel within a channel group in accordance with applicable regulations, and transmits signals to facilitate communications with nodes. A node sequentially tunes to individual channels within the group, monitoring each channel for a hub transmission during a monitoring period. If a hub transmission is detected, the node stays on the current channel. Otherwise, the node tunes to a next channel in the channel group. The hub transmission may be directed to unconnected nodes, to a single connected node, or to a group of connected nodes. The node transmits a first frame to the hub at a designated transmission time and receives a response. The node reports an emergency by sequentially transmitting emergency frames on each of the channels until receiving an acknowledgment from the hub.

24 Claims, 6 Drawing Sheets

Related U.S. Application Data division of application No. 12/856,167, filed on Aug. 13, 2010, now Pat. No. 8,942,145.

(60) Provisional application No. 61/234,016, filed on Aug. 14, 2009.

(51) Int. Cl.
*H04J 3/16* (2006.01)
*H04L 29/08* (2006.01)

(58) Field of Classification Search
CPC ..... H04L 43/50; H04L 43/0852; H04L 43/08; H04B 17/003
USPC ............................ 370/252, 328, 338, 310.2
See application file for complete search history.

(56) References Cited

U.S. PATENT DOCUMENTS

| | | |
|---|---|---|
| 7,570,612 B1 | 4/2009 | Loc et al. |
| 7,590,079 B2 | 9/2009 | Smavatkul et al. |
| 2010/0002590 A1 | 1/2010 | Park et al. |

* cited by examiner

IMPLANT ACCESS IN THE MEDICAL IMPLANT COMMUNICATIONS SERVICE BAND

CROSS-REFERENCE TO RELATED APPLICATIONS

Under 35 U.S.C. § 119(e), 120, 121, this continuation application claims benefits of and priority to U.S. patent application Ser. No. 14/567,410, (now U.S. Pat. No. 9,756,661), filed on Dec. 11, 2014, which is a divisional application that claims the benefit of and priority to U.S. patent application Ser. No. 12/856,167, filed on Aug. 13, 2010, which claims the benefit of and priority to the filing date of U.S. Provisional Patent Application No. 61/234,016, which is titled "Implant Access in the MICS Band," and filed on Aug. 14, 2009. The entirety of the above referenced applications are hereby incorporated herein by reference.

TECHNICAL FIELD

Embodiments of the invention are directed, in general, to medical systems and, more specifically, to access schemes for communications between an implant and a controller in the Medical Implant Communications Service (MICS) band and Medical Data Services (MEDS) band.

BACKGROUND

A MICS/MEDS based system includes at least a medical controller, also known as hub, and a medical implant, also known as node, operating in the MICS band 402-405 MHz or the MEDS band 401-402 MHz and 405-406 MHz, with a channel bandwidth of 300 kHz. The medical implant is located inside the body of a living organism and the medical controller is, in most cases, externally located. The power consumption by the transceiver forms a significant portion of the overall power consumption in the medical implant. Hence, it is desired to maximize efficiency of the medical implant transceiver to increase lifetime of the medical implant.

The power of the medical implant transceiver is utilized for performing various functions. In one example, the power consumption in the medical implant transceiver is dominated by an unconnected state of the medical implant transceiver. In the unconnected state, the medical implant transceiver wakes up periodically, such as every few seconds, and searches for a signal for connection with an external controller. In an connected state, the medical implant transceiver follows a procedure similar to that for the unconnected state, and wakes up periodically, which may be every few seconds, and searches for the external controller with which it has connected. In one example, the medical implant transceiver in a connected state follows the procedure because the medical implant needs to detect another medical controller transceiver. For example, if the medical implant is initially connected with a medical controller at home, but the living organism including the medical implant transceiver travels to a doctor's office, then the medical implant needs to detect and connect with the medical controller at the doctor's office. Hence the medical implant transceiver wakes up periodically, even when the medical implant transceiver is already connected with a medical controller, to detect other medical controllers. However, waking up in the connected state with a periodicity similar to that of the unconnected state leads to power wastage when the medical implant transceiver has to search for signals that typically have low strength. As the time for which the medical implant transceiver has to listen to the channel increases for signals with low strength, more power is wasted.

Communications between a controller (or "hub") and an implant (or "node") are subject to stringent regulatory restrictions. In particular, the hub often has to switch to a new operating channel selected from the ten channels total in the MICS band. The implant or node then needs to discover that new operating channel to communicate with the hub. A node cannot normally initiate a transmission to the hub, unless in an "implant event" (i.e., emergency). Furthermore, the node cannot choose the operating channel to use in an emergency, but instead the node must discover the hub's current operating channel to report the emergency. These are very challenging situations that typically are not encountered in wireless communications.

Existing solutions are either not power efficient or not in compliance with the FCC requirements for the MICS band. There is a need for a new technique for supporting communication between implants and controllers.

SUMMARY OF THE INVENTION

Embodiments of the invention provide access schemes for communications between an implant or node and a controller or hub in the MICS band or MEDS band. The systems and methods disclosed herein enable low-power communications for implants while meeting the FCC Part 95 requirements imposed in the MICS band. These embodiments use power-efficient access methods to enable data exchanges between an implant and a controller. In particular, an implant and a controller find each other among the ten possible MICS band channels in an orderly and timely fashion in each communications session.

In one embodiment, a hub chooses a channel from a channel group defined over the MICS band, and transmits a group of unconnected poll frames addressed to all unconnected nodes, to enable unconnected nodes to find it and connect with it on the chosen channel. An unconnected node searches for a hub by sequentially tuning a transceiver to individual channels within the channel group, and monitoring each individual channel for a hub transmission during a monitoring period. The node tunes the transceiver to a next individual channel in the channel group when no hub transmission is detected during the monitoring period. When a hub transmission is detected on a current channel within the channel group, the node stops the sequential tuning of the transceiver and identifies a transmission time from the hub transmission or from a subsequent hub transmission. The node then transmits a first frame to the hub.

The monitoring period may correspond to an unconnected poll frame cycle time plus a frame preamble time. The unconnected poll frame cycle time may correspond to an unconnected poll frame transmission time plus a frame preamble time plus a frame header time plus twice an inter frame space time. The first frame may be the node's first management frame. The node may receive a management frame from the hub in response to its transmitted management frame. The node may subsequently receive a unicast poll frame addressed to the node and transmit additional management frames following the unicast poll frame.

The hub may transmit a group of connected poll frames addressed to the node after the node is connected with it, preferably at a channel chosen according to some channel ordering scheme communicated to the node earlier. The node again tunes to individual channels of the channel group in turn, until it receives such a connected poll frame. The node starts from a channel based on the latest channel ordering scheme, and monitor each channel for a monitoring period that may correspond to a connected poll frame cycle time plus a frame preamble time. The connected poll frame cycle time may correspond to a connected poll frame transmission time plus a frame preamble time plus a frame header time plus twice an inter frame space time. The connected poll frame provides an immediate polled allocation, and the node transmits a frame to the hub in the immediate polled allocation. The node may receive a timed poll frame that is addressed to the node and that designates another immediate polled allocation. The node transmits additional frames following the timed poll frame.

The hub may also transmit a group of multicast poll frames addressed to a group of nodes, wherein the monitoring period corresponds to a multicast poll frame cycle time plus a frame preamble time. The multicast poll frame cycle time may correspond to a multicast poll frame transmission time plus an inter frame space time. Each multicast poll frame identifies a time for transmitting a unicast poll frame providing an immediate polled allocation to a node of the group of nodes within an individual session for the node. After receiving such a multicast poll frame on a channel, each node may sleep until the identified time, when it wakes up to receive a future poll, determines whether the future poll designates an individual session for the node, and then enters an inactive mode until a second future poll time indicated in the first future poll, if the future poll does not designate the individual session for the node. Each node may enter an active mode at the second future poll time and at subsequent future poll times. In the active mode, each node determines whether future polls received at the second future poll time and at subsequent future poll times designate the individual session for the node.

In another embodiment, a node may report an emergency event by sequentially tuning a transceiver to individual channels within a channel group. The node transmits an event notification frame on an individual channel, and then monitors the individual channel during a monitoring period for a hub response to the event notification frame. The monitoring period may correspond to an inter frame time plus a frame preamble time plus a frame header time plus a channel switch time. The node tunes the transceiver to a next individual channel in the channel group when no hub response is detected during the monitoring period. When a hub response is detected on a current channel within the channel group, the node stops the sequential tuning of the transceiver and, in response to the hub response, transmits one or more event data frames on the current channel. The event notification frame may have no payload data. The node may receive an acknowledgment frame in response to each event data frame sent to the hub.

In an alternative embodiment, a hub selects an operating channel from among a plurality of channels in a channel group and sequentially transmits poll frames on the operating channel at a poll separation interval. The hub monitors the operating channel for a node transmission during a monitoring period. The hub transmits an acknowledgment frame upon receiving a node transmission and transmits a timed poll frame to provide an allocation to the node for future transmissions. The hub transmits poll frames at a poll separation interval comprising a poll frame transmission time plus twice an inter frame space plus a frame preamble time plus a frame header time. The poll frames may be unconnected timed poll frames, and the node transmission may be a first management frame. The poll frames may be unicast poll frames addressed to a particular node, the unicast poll frames providing an immediate polled allocation for the particular node to transmit a frame.

In a further embodiment, a hub selects an operating channel from among a plurality of channels in a channel group and sequentially transmits a predetermined number of multicast poll frames on the operating channel. The multicast poll frames are addressed to a group of one or more nodes and identify a first time corresponding to a first individual node phase. At the first time, the hub transmits a unicast poll frame addressed to a first node and monitors the operating channel during an allocation interval designated in the unicast poll frame for frames transmitted by the first node. At a second time, the hub transmits a second unicast poll frame to a second node and monitors the operating channel during a second allocation interval designated in the second unicast poll frame for frames transmitted by the second node. The hub exchanges frames only with the first node during a first phase interval and exchanges frames only with the second node during a second session interval. Additional individual node phases may be established to communicate with additional nodes.

BRIEF DESCRIPTION OF THE DRAWINGS

Figure 1:
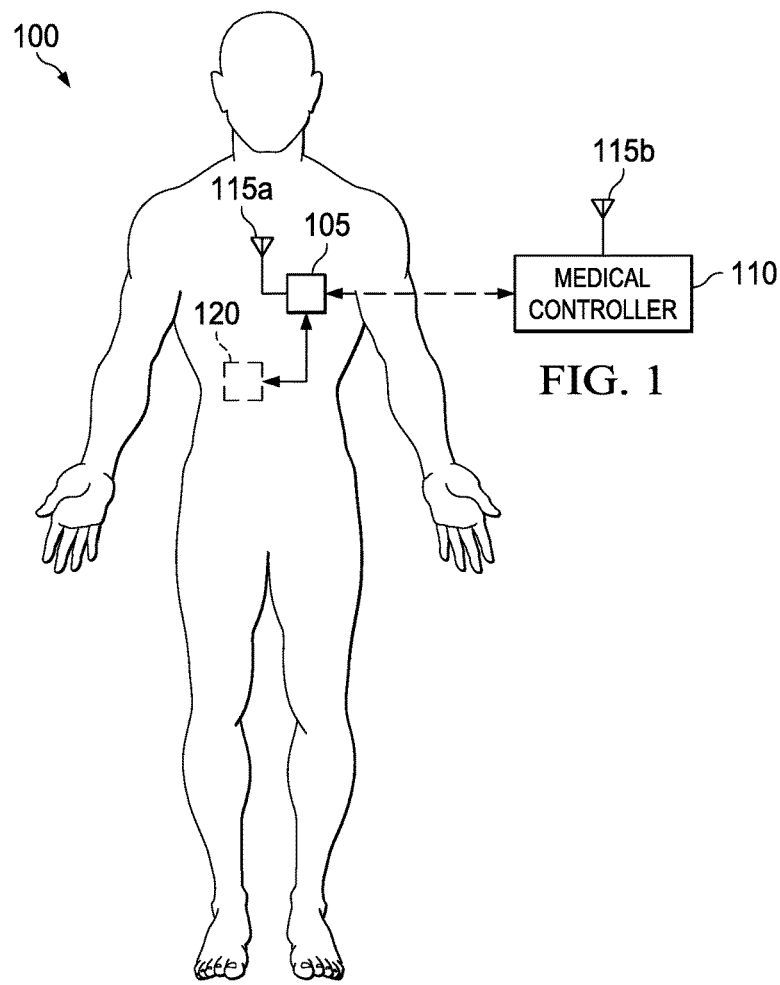
Figure 7:
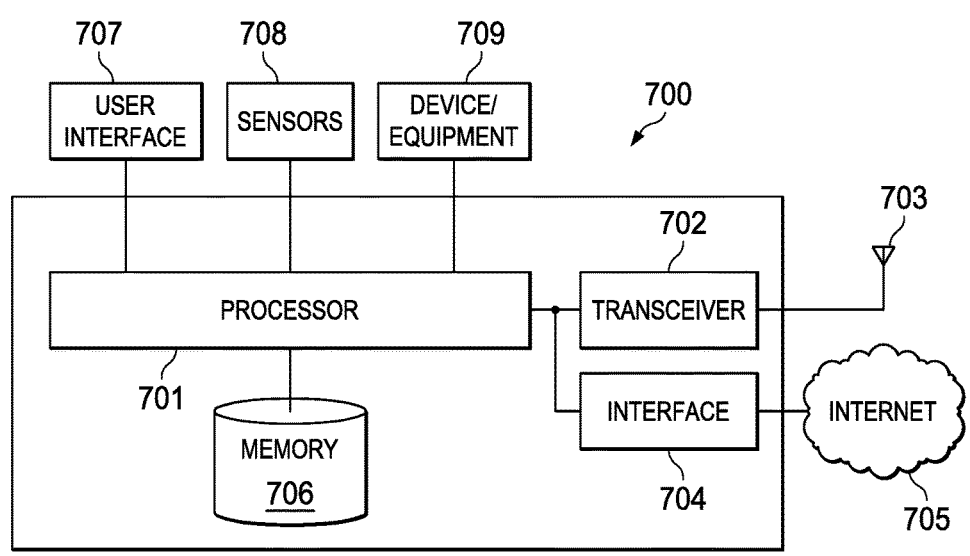
Figure 2:
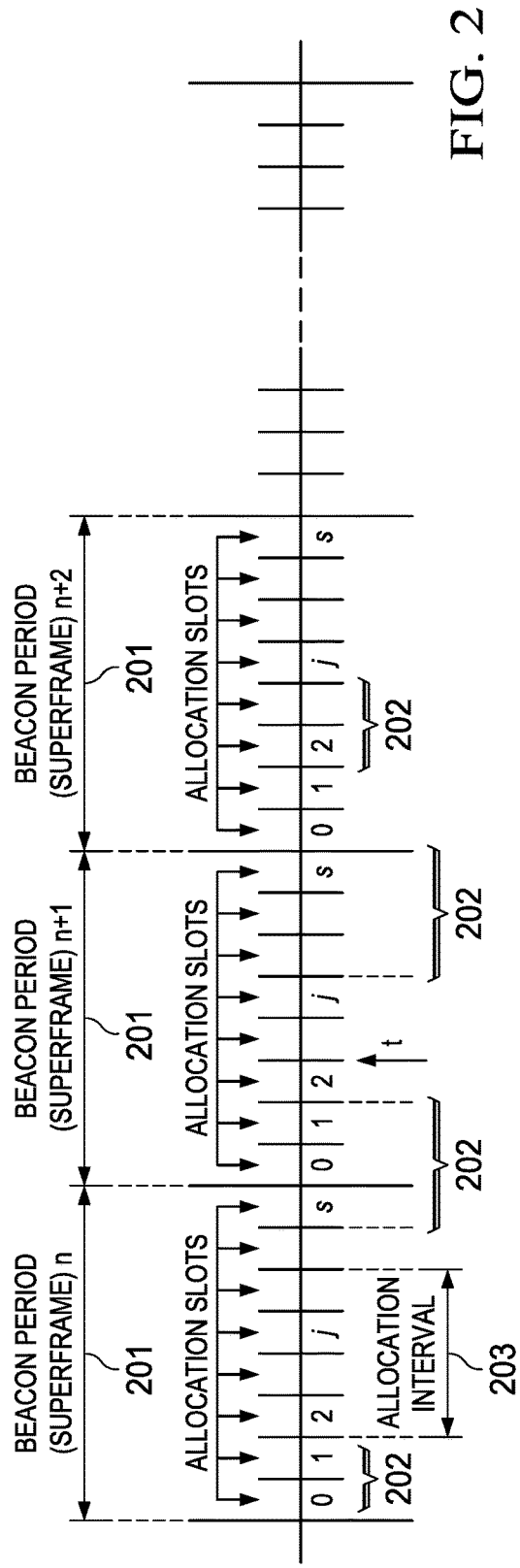
Figure 3:
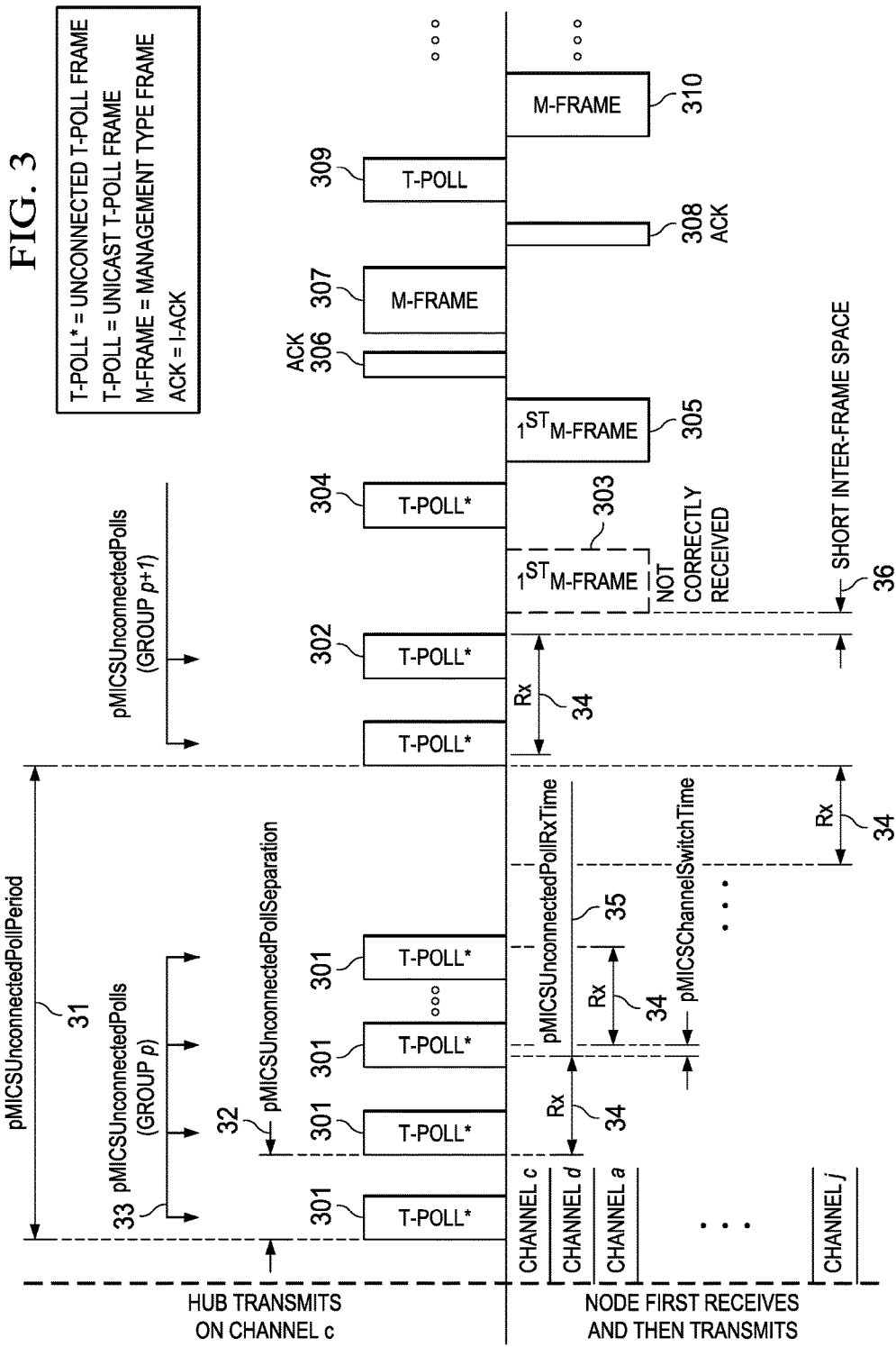
Figure 4:
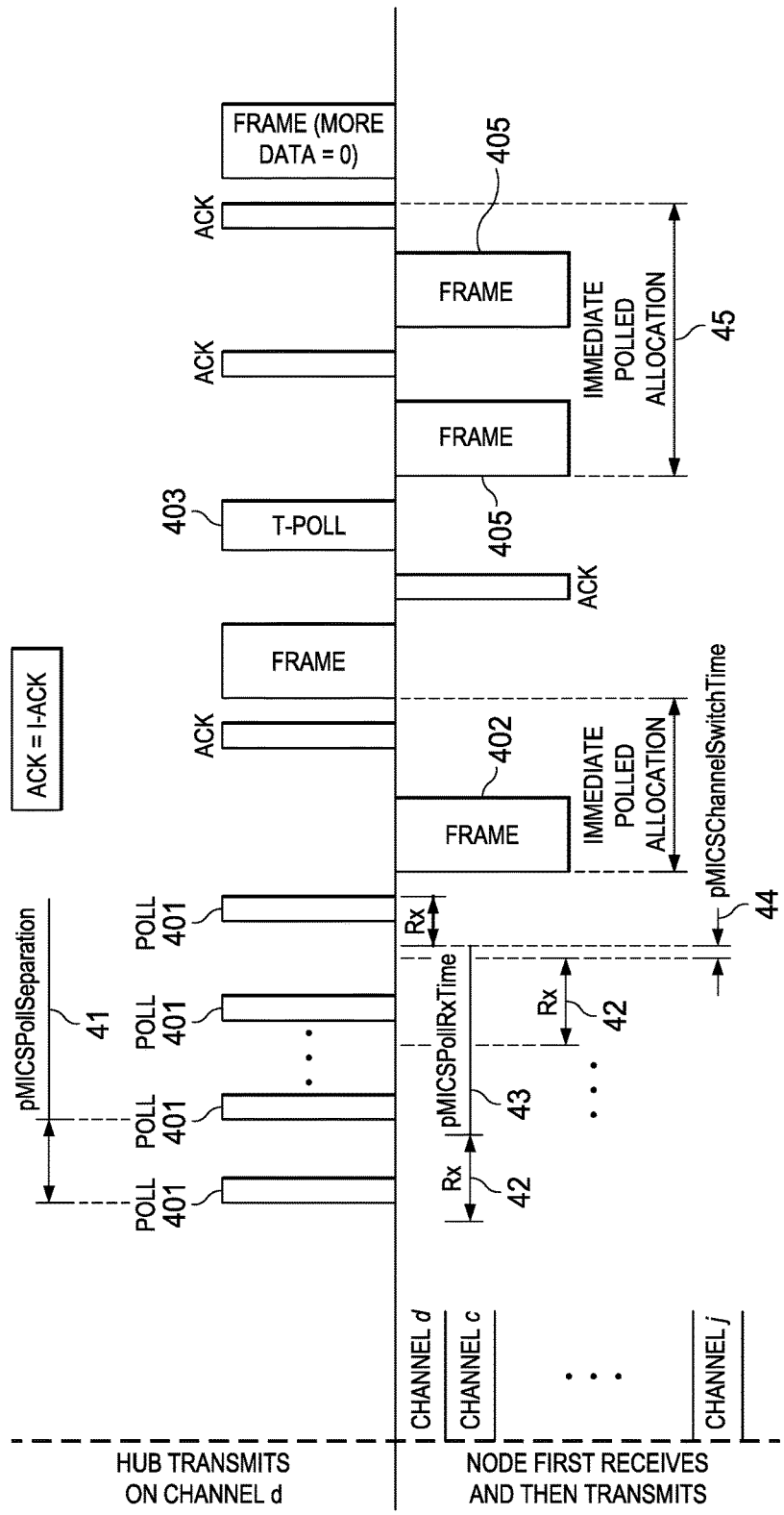
Figure 5:
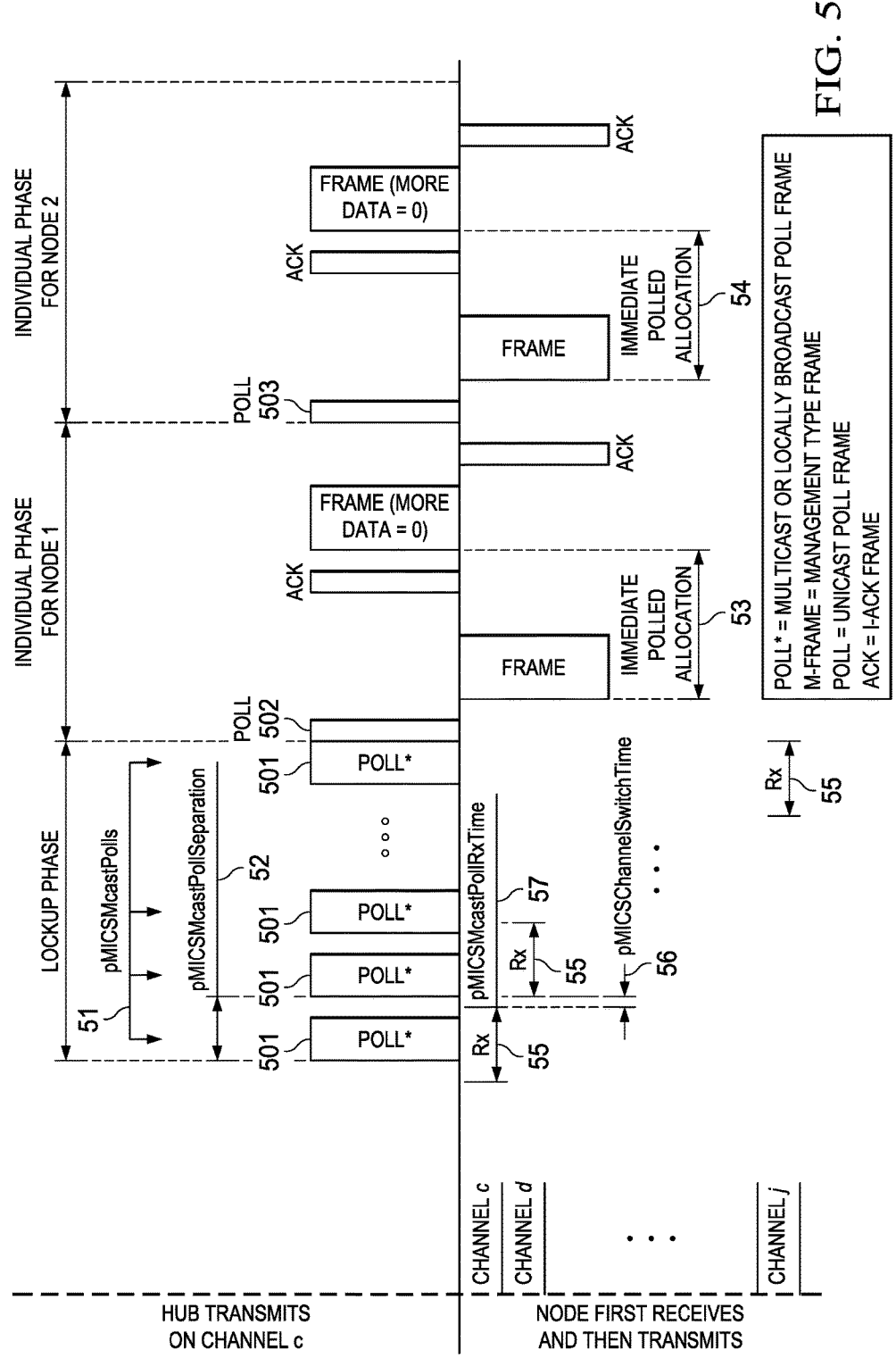
Figure 6:
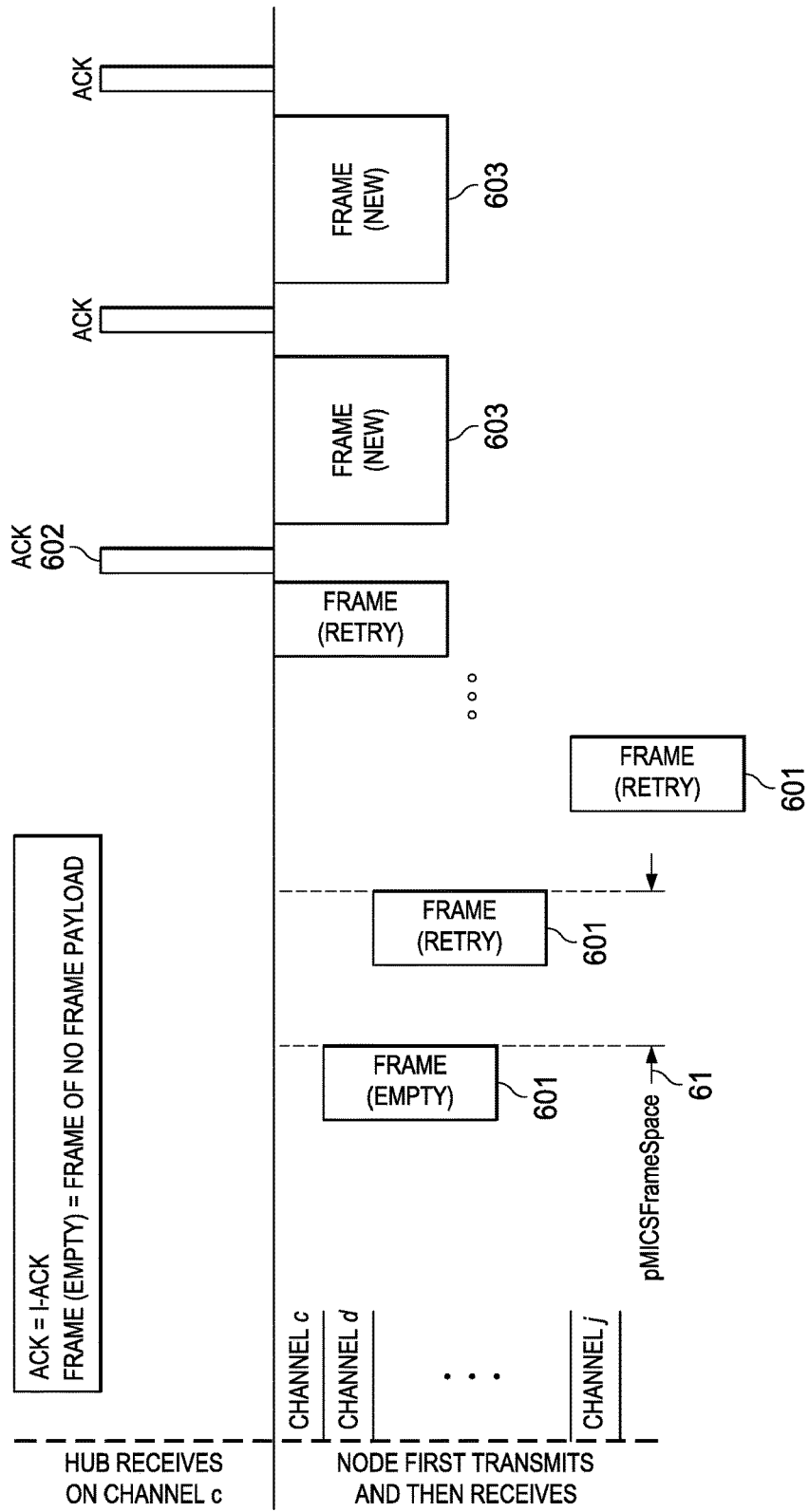

Having thus described the invention in general terms, reference will now be made to the accompanying drawings, wherein:

FIG. 1 illustrates a MICS/MEDS based system environment;

FIG. 2 illustrates a time reference base according to one embodiment;

FIG. 3 illustrates frames exchanged between a hub and a node for unconnected mutual discovery and connection setup;

FIG. 4 illustrates unicast poll aided connected discovery and frame exchange according to one embodiment;

FIG. 5 illustrates multicast poll aided connected discovery and frame exchange according to one embodiment;

FIG. 6 illustrates a process by which a node may issue a medical implant event report outside scheduled allocation intervals; and FIG. 7 is a block diagram of an exemplary embodiment of a device implementing embodiments of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates an environment 100 including, for example a MICS/MEDS based system. Examples of the environment 100 include, but are not limited to, intensive care units (ICUs), hospital wards, and homes. The environment 100 includes, for example, a medical implant 105, herein referred to as node 105, and a medical controller 110, herein referred to as hub 110.

The node 105 includes a medium access controller (not shown), a transceiver (not shown), and an antenna 115*a* to receive and transmit signals. The node 105 may also include or be connected to sensors, for example a sensor 120. Each sensor monitors and samples various health details. Examples of the types of sensors 120 used with node 105 include, but are not limited to, pacemakers and brain sensors. The hub 110 includes a medium access controller (not shown), a transceiver (not shown), and an antenna 115b to transmit and receive signals. The node 105 and the hub 110 each may further include a host or application processor (not shown).

The node 105 and the hub 110 can communicate with each other in the MICS frequency band, which ranges from 402-405 MHz. In alternative embodiments, the node 105 and the hub 110 may also communicate with each other in the MEDS frequency band, which ranges from 401-402 MHz and from 405-406 MHz. It will be understood that the systems and methods described herein may also be used in other frequency bands and with other, non-medical devices.

A normal communication session is initiated by the hub 110. The hub 110 selects a channel for transmission based on certain criteria. In one example, the hub 110 selects either a least-interfered channel or a channel that has an interference power below a threshold. The selection process is typically referred to as "Listen Before Talk" (LBT). The hub 110 then transmits a signal in the selected channel.

The node 105 is initially an unconnected node in an unconnected state where it does not have a connected node identifier (NID), a scheduled periodic allocation, or a power wakeup arrangement set up with the hub 110. The node 105 searches for a poll signal for connection with a hub, such as the hub 110, through some management frame exchanges between the node and the hub. When the node 105 is connected with the hub 110, it has a connected NID, and optionally a scheduled periodic allocation and a power wakeup arrangement set up with the hub 110.

In one example, the node 105 wakes up with the same periodicity, such as every few seconds, in both the unconnected and connected states to detect and connect with a hub. However, this leads to power wastage. Power usage by the node could be reduced if it used a different periodicity for the unconnected state and the connected state.

The periodicity for wakeup or active state is determined based on the operating conditions. In one embodiment, the node 105 enters into inactive state from active state to optimize power consumption based on the operating conditions. Further, signal strength might also differ based on the operating conditions. In one embodiment, the node 105 optimizes power consumption by searching for signals at different sensitivities based on the operating conditions.

In one example, the node 105 is connected with the hub 110 at home. The living organism including the node 105 travels from the home to a doctor's office. It might take around fifteen minutes, for example, to get close to another hub at doctor's office from the hub 110 at the home. In an illustrated example, when the node 105 is connected with the hub 110 at home then the time duration between two poll signals can be five minutes, for example. The hub 110 at the home can transmit a poll signal once every five minutes to allow nodes such as the node 105 to synchronize with it and also to indicate that it is in the vicinity of the node 105. The power consumption is reduced as the node 105 has to wake up once every five minutes instead of once every few seconds. If the node 105 does not detect the signal from the hub 110 for three consecutive attempts, the node 105 may decide that it is not in close proximity to the hub 110. The node 105 then wakes up periodically with a period on the order of a few seconds to detect a hub. The node 105 might be in close proximity to the hub 110 at the home for around 8-12 hours a day and hence having different periodicity in the connected case as compared to that in the unassociated case saves power and battery life.

In another example, the operating conditions may include a hospital environment. Low sensitivity and low latency is desired at the hospital because the living organism including the node 105 is in close proximity to the hub 110. The latency for initiating connection with the hub 110 at the hospital needs to be low as the doctor may not desire to wait for long for the node 105 to connect with the hub 110.

In yet another example, the operating conditions may include a home environment. High sensitivity is desired at the home because the living organism including the node 105 needs to have freedom to move around and might not be in close proximity to the hub 110. The data that needs to be transferred is less and sporadic, and hence the latency may be high.

In still another example, the operating conditions may change dynamically when the living organism is travelling. It is desired that the node 105 is adaptable to dynamically varying conditions.

A hub creates and maintains superframe boundaries through transmitting T-Poll frames at appropriate times as described below, where a superframe would be a beacon period if the hub were to transmit a beacon in it. A node determines the superframe boundaries through receiving T-Poll frames that contain a timestamp of their transmission time in reference to superframe boundaries.

FIG. 2 illustrates a time reference base according to one embodiment of the invention. The nodes and hubs must establish a time reference base, if their medium access is to be scheduled in time. The time axis is divided into superframes 201 of equal length, and each superframe is composed of equal-length allocation slots 202. An allocation interval 203 may be referenced in terms of the superframe 201 and the numbered allocation slots 202 comprising the allocation interval 203. A point of time (t) may be referenced in terms of the numbered allocation slot 202 preceding or following the time as appropriate. The point in time (t) may also be referenced in terms of an offset from the start of the allocation slot 202.

If a time reference is needed for access scheduling, the hub may choose the boundaries of superframes and the allocation slots therein. In a non-beacon mode operation—in which beacons are not transmitted but a time reference is needed—the hub communicates boundaries by transmitting timed frames (T-Poll frames) containing a transmit time relative to the start time of current superframe. The nodes are aware of the superframe/allocation slot reference system and know the duration of the superframes and allocations slots. A node requiring a time reference derives and recalibrates the boundaries of superframes and allocation slots from received timed frames (T-Poll frames). A frame transmission may span more than one allocation slot. The frame transmission may or may not start and end on an allocation slot boundary. Alternatively, the frame transmission may begin at some point offset from the beginning of an allocation slot.

A Timed-Poll (T-Poll) frame is transmitted by a hub to grant the addressed node an immediate polled allocation that starts at some period (for example, a SIFS or pSIFS duration as defined below) after the end of the frame or to inform the node of a future poll or post. The T-Poll frame also provides the hub's current time for the node's clock synchronization. The SIFS (short inter-frame space) period may be a fixed interval, such as 50 μs, that allows the addressed node to shift from a receive mode to a transmit mode, or vice versa.

In embodiments of the invention, the hub selects a specific operating channel out of a group of N possible channels, such as a group of ten channels. The hub follows regulatory requirements to select the operating channel, such as selecting a channel with a monitored power level below a threshold level or a channel within the group that has the lowest monitored power level. Once the hub has selected an operating channel, the hub transmits groups of unconnected T-Poll (T-Poll*) frames over the operating channel to nearby unconnected nodes. The hub may choose a new channel only when required by applicable regulations and considerations. In normal operation, the node communicates with the hub only in response to the T-Poll or T-Poll* frames. In emergency operation, as discussed in more detail below, the node may initiate communications with the hub. However, in either case, the node does not know which of the channels has been selected as the operating channel by the hub, and the hub does not know if the node is listening on the selected operating channel. The node must discover the hub's selected operating channel in order to communicate with the hub.

The hub and the node may perform a mutual discovery procedure, such as the process described below, immediately before their frame exchanges. In general, the hub transmits a group of T-Poll* frames on the selected channel and listens in between on the selected channel for a transmission from an unconnected node. After transmitting a T-Poll* frame, if no node transmits a management frame (M-frame) in response, then the hub transmits another T-Poll* frame on the selected channel at predetermined intervals. In one embodiment, the amount of time that the hub listens for a node to respond to the T-Poll* frame is equivalent to one SIFS plus the duration of a frame preamble, plus the duration of a frame header. The hub transmits T-Poll* frames on a cycle equal to the duration of the T-Poll* frame plus one SIFS plus the listen time (i.e., hub cycle duration=duration of T-Poll* frame+2×SIFS+preamble+header). Subsequently, the hub transmits another group of T-Poll* frames on the same channel or a different channel and listens in between for a transmission from an unconnected node.

While the hub is transmitting groups of its T-Poll* frames, an unconnected node listens on a first channel from the channel group. If the unconnected node does not detect a T-Poll* frame, it then switches to the next channel in the group and listens again for a T-Poll* frame from the hub. The node continues this procedure and cycles through the channel group until it detects a T-Poll* frame or a predefined timeout. The order in which the node traverses the channels may be in a predefined list or in a list previously transmitted by a hub. The unconnected node starts again at the beginning of the channel group list if it does not detect a hub during a first pass through the group. The node continues cycling through the channel group until a hub is detected or a predefined timeout.

The node must listen on each channel for a duration sufficient to detect one T-Poll* frame transmitted by the hub. Accordingly, the node must listen for at least the duration of the hub's T-Poll* frame cycle time plus some margin. In one embodiment, the margin is equivalent to a frame preamble time. When a hub is not detected on the current channel, the node requires a channel switch time to change from one channel to another. Accordingly, the node operates on a cycle equivalent to the T-Poll* frame cycle, plus a frame preamble time, plus a channel switch time (i.e. node cycle duration=duration of T-Poll* frame cycle+preamble+channel switch). The node's listen cycle is longer than the hub's transmit cycle, which may require the hub to transmit more than N T-Poll* frames before the node can listen on all N channels in the group. However, the margin added to the node's listen time ensures that the node will eventually detect one of the T-Poll* frames. In one embodiment, where the number of channels (N) in the group is ten, the node should detect the hub within thirteen T-Poll* frame cycles.

FIG. 3 illustrates frames exchanged between a hub and a node for unconnected mutual discovery and connection setup. In the example of FIG. 3, the frames transmitted by the hub on a selected channel (e.g. channel c in the example) are shown above the x-axis (time axis). The channels that are being monitored by the node at a particular time and the frames transmitted by the node are shown below the x-axis (time axis).

The hub chooses an operating channel based upon applicable regulatory requirements. It then transmits a group of unconnected T-Poll frames (T-Poll*) 301 at predetermined unconnected poll separation intervals (pMICSUnconnectedPollSeparation) 32. A T-Poll* frame is a T-Poll frame addressed to a logical group of unconnected nodes with a node identifier (NID) of Unconnected_Broadcast_NID, for example. The hub may transmit up to a predetermined number of T-Poll* frames (pMICSUnconnectedPolls) 33 in such a group. The hub listens for a frame arrival pSIFS after each T-Poll* frame transmission and pSIFS before next T-Poll* frame transmission. The hub may transmit another group of T-Poll* frames with a period of pMICSUnconnectedPollPeriod 31.

The value of pMICSUnconnectedPollPeriod 31 is determined based upon an overall consideration of connection latency, power consumption, channel utilization efficiency, interference, and other factors. The value of pMICSUnconnectedPolls 33 is designed to provide enough unconnected T-Poll frames so that a node can receive one of them within a cycle of tuning to and listening on each of the MICS band channels. The value of pMICSUnconnectedPollSeparation 32 is selected such that the hub can detect a frame sent by a node following its last T-Poll* frame before it would otherwise send the next T-Poll* frame.

An unconnected node in need of a connection may discover a hub by cyclically tuning to each channel 34 for a predetermined listen period (pMICSUnconnectedPollRxTime) 35 until the node receives a T-Poll* frame 301 and hence discovers a hub. Once the hub is discovered, the unconnected node should stay on the current channel unless directed to switch channels. The value of pMICSUnconnectedPollRxTime 35 is selected to ensure within a certain margin that a node can receive one of two adjacent T-Poll* frames once the node tunes to the transmit channel selected by the hub.

Upon detection of a T-Poll* 302 on a monitored channel, the node sends a first management frame (1$^{st}$ M-frame) 303 to the hub at pSIFS 36 after the end of T-Poll* frame 302. First management frame 303 is transmitted with a transmit probability P=max(1/2, 1−R/4), where R is the number of the retries of the same frame, i.e., R equals 0 before any retry, 1 for the first retry, 2 for the second retry, and so on. If the node does not receive an expected immediate acknowledgement (I-Ack) frame from the hub or if the node did not send the first management frame 303 due to the transmit probability constraint, the node stays on receive mode to receive another T-Poll* 304 frame. The node then transmits or retransmits its first management frame 305 to the hub until the node receives the expected I-Ack frame 306 from the hub. The node sets the Recipient Address field in the 1$^{st}$ M-frame to the IEEE MAC (medium access control) address of the hub or to zero if the node does not yet know the IEEE MAC address of the hub.

If the hub receives a frame with an erroneous frame check sequence (FCS) value following its last T-Poll* frame, it transmits another T-Poll* frame at time SIFS after the end of the erroneous frame. The hub repeats sending T-Poll* frames until it correctly receives a frame.

After receiving a management frame 305 from an unconnected node, the hub improvises a posted allocation to the node while acknowledging the frame with an I-Ack frame 306. At the start of the allocation, the hub sends a management frame (M-frame) 307 to the node in response to the last management frame 305 received from the node. The hub resends the M-frame 307 if it fails to receive an expected I-Ack frame 308 from the node. If the hub expects more management frames from the node for the unconnected exchange, the hub improvises a polled allocation to the node by sending a T-Poll frame 309 addressed to the node. T-Poll frame 309 is a unicast frame sent just to one node and only the addressed node may respond to the T-Poll frame 309. The hub resends the T-Poll frame if it fails to receive the expected management frame 310 from the node. The hub repeatedly invokes improvised access as described in the above to advance the unconnected exchange, until it has created a connection with the node, such as by successfully sending a Connection Assignment frame to the node.

After the node sends a management frame 305 and receives an I-Ack frame 306 that contains a posted allocation for it, the node stays on receive mode from the start of the allocation until it receives an expected management frame 307 from the hub in response to its last management frame 305. If the node has more management frames to send for the unconnected exchange, after acknowledging the last management frame received from the hub in an acknowledgement frame 308, the node may stay on receive mode again until it receives a T-Poll frame 309 addressed to itself only. At time pSIFS after the end of the T-Poll frame 309, the node sends its next management frame 310 to the hub. If the node fails to receive an expected I-Ack frame, the node again switches to receive mode and listens for another T-Poll frame and then retries sending its last frame until an I-Ack frame is received. The node repeats the same improvised access in lockstep with the hub as described above to advance the unconnected exchange until the node is connected with the hub. The management frames may include, for example, security association, security disassociation, pairwise temporal key, group temporal key, connection request, connection assignment, multimode connection assignment, disconnection, and command frames.

If secured communication with each other is desired or required, the hub and the node perform a security association procedure to activate a pre-shared master key or generate a new shared master key, perform a pairwise temporal key creation procedure to establish a pairwise temporal key, and perform secure frame exchanges, as described, for example, in the following pending U.S. patent applications: application Ser. No. 12/697,113, titled "Password-Authenticated Association Based on Public Key Scrambling," filed Jan. 29, 2010; application Ser. No. 12/697,080, titled "Pairwise Temporal Key Creation for Secure Networks," filed Jan. 29, 2010; application Ser. No. 12/697,086, titled "Authentication and Encryption for Secure Data Transmission," filed Jan. 29, 2010; application Ser. No. 12/697,110, titled "Frame Structure for Medium Access in Body Area Networks (BAN)," filed Jan. 29, 2010; and application Ser. No. 12/697,105, titled "Access and Power Management for Centralized Networks," filed Jan. 29, 2010. The disclosure of each is hereby incorporated by reference herein in its entirety.

The hub and the unconnected node stay on the same channel and follow a connection setup procedure by exchanging the management type frames. The hub and node negotiate a wakeup arrangement and scheduled allocations as appropriate. The hub provides the node with an ordered list of channels that it intends to choose in decreasing likelihood when required to choose a new channel. When required by regulations, the hub subsequently selects a new channel in the order indicated in the list. The hub may provide an updated channel order list to nodes in view of changes in the channel conditions, such as interference levels or other considerations.

The connected node obtains a periodic allocation from the hub for periodic communication with the hub and efficient power management. The operating channel may need to change from one allocation interval to the next in compliance with applicable regulatory requirements. FIG. 4 illustrates unicast poll aided connected discovery and frame exchange according to one embodiment. The hub may send data or management frames to a node in a periodic allocation interval designated for the node, or outside such an interval using improvised polling and posting access.

Prior to the start of an allocation interval for a connected node, the hub chooses a new operation channel only if required for regulatory compliance. In the illustrated example, the hub is transmitting on channel d. When the allocation interval starts, the hub sends a unicast Poll frame 401 to the node. Each unicast Poll frame 401 is addressed to the node specifically and provides an immediate polled allocation. Poll frame 401 does not contain a timestamp, but T-Poll frame 403 which is sent later does and provides sufficient information for the node to resynchronize with the hub. The hub listens for a frame arrival pSIFS after each transmission and pSIFS before the next transmission of such Poll 401. If the hub fails to detect a frame arrival from the addressed node, the hub sends another T-Poll frame 401 at a poll separation time (pMICSPollSeparation) 41 after the end of the previous T-Poll frame 401. The hub sends up to a predetermined number (pMICSPolls) of consecutive T-Poll frames 401 before the start of next allocation interval. If the hub receives a frame with an invalid FCS value or a frame that indicates that the node has more data for transfer, the hub sends another Poll frame pSIFS after the end of the frame, so long as a frame transaction following the last Poll frame can be completed before the start of another allocation interval already assigned to another node.

A connected node may have the time for a pending frame exchange with a hub designated, for example, by scheduling or other means. Accounting for an appropriate guard time, the node transitions to active state at the designated time and tunes to the channel on which it last received a frame with a valid FCS from the hub. After dwelling 42 on the current channel for a designated time (pMICSPollRxTime) 43, the node switches to another channel in accordance with the last channel order provided by the hub. The node dwells 42 on each channel in the list until it receives a Poll frame 401 addressed to it. The node requires a predetermined time (pMICSChannelSwitchTime) 44 to tune to the next channel on the list. Once it receives a Poll frame 401 addressed to it, the node should not further change the channel unless directed otherwise. If the node receives a frame with an incorrect FCS value, the node stays in receive mode on the same channel, until it receives a Poll frame 401 or until the end of the current allocation interval. After the hub and the connected node are on the same channel, they may exchange more frames with each other using appropriate access methods, such as a fixed-channel based medium access method, as described in application Ser. No. 12/697,105, titled "Access and Power Management for Centralized Networks," filed Jan. 29, 2010.

While cycling through the MICS band channels for mutual discovery with the hub, if the node receives a Poll frame sent by the hub but addressed to a different node, the node should skip that channel from its subsequent channel cycling for the duration of the polled allocation granted via the Poll frame.

After it receives a Poll frame 401 addressed to it, the node transmits a frame 402 pSIFS after the end of the Poll frame. The node may transmit more frames if the frame transactions can be completed before the end of the current allocation interval. The node may indicate that it has more frames to transmit even if the frame transactions cannot be completed. The hub may send a T-Poll frame 403 providing a time stamp and an immediate polled allocation interval 45 for the node to calibrate its clock and transmit additional frames 405.

FIG. 5 illustrates multicast poll aided connected discovery and frame exchange according to one embodiment. Multicast poll aided discovery may be used when the hub is attempting to communicate with multiple nodes. Prior to more frame exchanges with a group of connected nodes, the hub transmits a group 51 (pMICSMcastPolls) of multicast or locally broadcast Poll frames 501 during a lockup phase. The start of each of the multicast Poll frames 501 is separated by a predetermined period (pMICSMcastPollSeparation) 52. The multicast Poll frames 501 are addressed to the multicast node identifier (Multicast_NID) of a group of nodes. Multicast Poll frames 501 do not provide an immediate polled allocation, but instead announce a future poll starting at the intended beginning of the first individual communication phase with one of the nodes in the group. In particular, the time of the future poll is encoded in the multicast Poll frame 501. The group of multicast Poll frames 501 may be separated by pSIFS in one embodiment.

The end 58 of the multicast Poll frames indicates the beginning of individual phases 59 in which the hub transmits unicast Poll frames addressed to specific nodes for each individual phase 59. The hub transmits a Poll frame 502 addressed to a first individual node in the group at the indicated future poll time and provides an immediate polled allocation 53. The first node and the hub exchange frames within a designated phase. At a second future poll time, the hub transmits a Poll 503 addressed to a second individual node within the group and provides an immediate polled allocation 54 for the second node. The hub continues initiating individual phases with each of the nodes in the group in a similar manner.

The connected nodes of the group enter active state in anticipation of pending frame exchanges with the hub. Accounting for an appropriate guard time, at the time for the anticipated frame exchanges, each of the nodes tune to the channel in which it last received a frame with a valid FCS from the hub. After dwelling 55 on the current channel for a designated time (pMICSMCastPollRxTime) 57, each node then switches to the next channel in accordance with the last channel order provided by the hub. The node dwells 55 on each channel in turn until the node receives a Poll frame 501 addressed to the Multicast_NID of the group (such a Poll frame is designated as Poll*). The node requires a predetermined time to change channels (pMICSChannelSwitchTime) 56. Once a Poll frame 501 is detected, the node should not further change its operating channel unless recommended otherwise. The node may enter a sleep (inactive) state until the start of the first individual phase as announced in the received Poll frame, at which time the node enters an active state to receive a unicast Poll frame 502. If unicast Poll frame 502 is addressed to the node, the node and hub may exchange further frames. Otherwise, the node may enter a sleep mode and wake up again for the next unicast Poll frame 503 starting another individual phase and again determine whether the poll is addressed to the node.

FIG. 6 illustrates a process by which a node may issue a medical implant event report outside scheduled allocation intervals. In the MICS band, only the hub may initiate transmissions in normal situations. The hub does not use beacon frames in this band to reduce interference. However, in an emergency, the node may need to initiate transmissions to report a medical implant event.

When not transmitting, a hub should stay on receive mode in the channel selected according to the channel order list that the hub communicated to the nodes connected with it. A node connected with a hub may transmit frames reporting a medical implant event in its next scheduled allocation interval, if one is available, following a Poll or T-Poll frame granting an immediate polled allocation to it by the hub, using the unicast or multicast connected mutual discovery procedure as described above.

Alternatively, the node may transmit such frames anytime as illustrated in FIG. 6. The node transmits an emergency data frame 601 in the first channel of the channel order list last received from the hub. The emergency data frame 601 has no frame payload and its acknowledgement policy field is set to immediate acknowledgement. The payload of the emergency data frames 601 is empty to avoid wasting time and power sending data without knowing if the hub is operating on that channel. The node retries the frame up to a predefined number of attempts (pMICSNodeEmergencyRetries) on this channel if it fails to receive an expected acknowledgment. The monitoring period for the node corresponds to a frame preamble time plus a frame header time. The node repeats the emergency data frames 601 at an interval (pMICSFrameSpace) 61. If the node still receives no acknowledgment after this number of attempts, it should similarly send and retransmit the emergency data frame 601 in the next channel on the channel order list, and again in another channel, until it receives an expected I-Ack frame 602 or pauses its transmission. The node spaces one data frame and the next as if an I-Ack frame were received in between. In a typical embodiment, the hub stays on its channel and the node cycles through the channels to find the hub.

After receiving an I-Ack frame 602, the node should proceed to transmit emergency data frames 603 with incremental sequence numbers. Emergency data frames 603 contain frame payloads generated from the medical implant event. The node sets the more data field in the MAC header of the emergency data frames 603 to one except for the last such frame. The node sets the more data field in the MAC header of that last frame to zero to indicate the end of the medical event report transfer. On receiving an emergency data frame 603 with a more data field set to one from the node, the hub should not initiate its own frame transactions with this node or another node until it has received all emergency data frames 603 as indicated by the more data field value. While the hub is receiving emergency data frames 603 from a node, it does not service other nodes and remains on the channel.

When a hub is attempting to contact a node, after retrying a frame for up to a predetermined number of attempts (pMICSHubMaxRetries) without receiving an expected response, the hub should enter the receive mode to receive possible emergency data frames.

Table 1 is a list of Physical Layer (PHY)-dependent Medium Access Control (MAC) sublayer parameters referred to above with respect to FIGS. 3-6 according to one embodiment. It will be understood that the parameters shown in Table 1 may be set to other values in other embodiments. The function [x] is defined to be the least integer not smaller than x (i.e., rounding up). Where a parameter is shown in FIGS. 3-6, its corresponding label is provided in Table 1.

TABLE 1

| PARAMETER | LABEL IN FIGURES | VALUE |
|---|---|---|
| pMICSAckTxTime | | pMICSPreambleTxTime + pMICSPLCPHeaderTxTime + (7 + 2) × 8/75.9 ms = 1594 μs |
| pMICSChannelsTotal | | 10 |
| pMICSChannelSwitchTime | 44, 56 | 100 μs |
| pMICSFrameSpace | 61 | pSIFS + pMICSAckTxTime + pMICSChannelSwitchTime |
| pMICSHubMaxRetries | | 10 |
| pMICSMcastPollRxTime | 57 | pMICSMcastPollSeparation + pMICSPreambleTxTime = 2094 μs |
| pMICSMcastPolls | 51 | ⌈ pMICSChannelsTotal × (pMICSMcastPollRxTime + pMICSChannelSwitchTime )/ pMICSMcastPollSeparation ⌉ = 14 |
| pMICSMcastPollSeparation | 52 | pMICSPollTxTime + pMIFS = 1614 μs |
| pMICSNodeEmergencyRetries | | 2 |
| pMICSPollRxTime | 43 | pMICSPollSeparation + pMICSPreambleTxTime = 2819 μs |
| pMICSPollSeparation | 41 | pMICSPollTxTime + 2 × pSIFS + pMICSPreambleTxTime + pMICSPLCPHeaderTxTime = 2339 μs |
| pMICSPollTxTime | | pMICSAckTxTime = 1594 μs |
| pMICSPreambleTxTime | | 90/187.5 ms = 480 μs |
| pMICSPLCPHeaderTxTime | | 31/187.5 ms = 165 μs |
| pMICSUnconnectedPollPeriod | 31 | >pMICSUnconnectedPollSeparation × pMICSUnconnectedPolls = 35880 μs |
| pMICSUnconnectedPollRxTime | 35 | pMICSUnconnectedPollSeparation + pMICSPreambleTxTime = 3240 μs |
| pMICSUnconnectedPolls | 33 | ⌈ pMICSChannelsTotal × (pMICSUnconnectedPollRxTime + pMICSChannelSwitchTime)/ pMICSUnconnectedPollSeparation ⌉ = 13 |
| pMICSUnconnectedPollSeparation | 32 | pMICSUnconnectedPollTxTime + 2 × pSIFS + pMICSPreambleTxTime + pMICSPLCPHeaderTxTime = 2760 μs |
| pMICSUnconnectedPollTxTime | | pMICSPreambleTxTime + pMICSPLCPHeaderTxTime + (7 + 4 + 2) × 8/75.9 ms = 2015 μs |
| pSIFS (SIFS) | | 50 μs |

It will be understood that the parameters and variables described herein may be assigned different labels. For example, in the priority application U.S. Provisional Patent Application No. 61/234,016, which is incorporated by reference above, the term TIFS is used in place of SIFS and other parameters have similar names, but begin with an "m" instead of "p."

FIG. 7 is a block diagram of an exemplary embodiment of a device 700 implementing embodiments of the invention. Device 700 may be used as a node (105) and/or a hub/controller (110) in FIG. 1. In one embodiment, device 700 is a hub, gateway, or controller controlling and communicating with one or more nodes 700. Processor 701 processes data transmitted to or received from a hub or other nodes via transceiver 702 and antenna 703 and/or via wireline interface 704 coupled to Internet or another network 705. Where device 700 is a medical implant device, wireline connection may not be present or may be unused unless the device is accessible externally. Processor 701 may be a software, firmware, or hardware based component, or a combination thereof. Processor 701 may also control the transmission and reception of frames with a hub or connected and unconnected nodes.

Memory 706 may be used to store data and computer program instructions, software and firmware used by processor 701, and any other parameters needed in the course of communication described in the above. It will be understood that memory 706 may be any applicable storage device, such as a fixed or removable RAM, ROM, flash memory, or disc drive that is separate from or integral to processor 701. Device 700 may be coupled to other devices, such as user interface 707, sensors 708, or other devices or equipment 709, which may include, for example, sensor 120 in FIG. 1.

Device 700 may be adapted to operate in a body area network either as a node or as a hub controlling a plurality of nodes. Sensors 708 may be used, for example, to monitor vital patient data, such as body temperature, heart rate, and respiration. Equipment 709 may be, for example, a monitor or other device that receives and analyzes signals, such as a patient's temperature, heart rate, and respiration, from another node. Alternatively, equipment 709 may be a device for providing a service to a patient, such as controlling an intravenous drip, respirator, or pacemaker.

It will be understood that the medical implant/node 105 and medical controller/hub 110 in FIG. 1 and the device 700 in FIG. 7 are presented for illustrative purposes only and are not intended to limit the scope of the systems or devices that are capable of employing the unconnected mutual discovery, unicast and multicast poll aided connected discovery, frame exchange, and medical implant event/emergency report procedures described herein.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A network node, comprising:
a transceiver;
a memory storing a list of channels; and
a processor coupled to the transceiver and the memory, and configured to
cyclically tune the transceiver to each of the channels stored in the memory for a listen period (pMICSUnconnectedPollRxTime) including a preamble transmission time (pMICSPreambleTxTime);
discover a network hub upon receiving a timed poll (T-Poll) frame from the network hub;
assign one of the channels at which the network hub is discovered as a current channel; and
stop cyclically tuning the transceiver to stay on the current channel.

2. The network node of claim 1, wherein the pMICSPreambleTxTime is 480 µs.

3. The network node of claim 1, further comprising:
a medical implantable device housing the transceiver, the memory, and the processor.

4. The network node of claim 1, wherein the processor is configured to transmit a management frame (M-Frame) to the network hub using the transceiver and via the current channel.

5. The network node of claim 1, wherein the pMICSUnconnectedPollRxTime is set at a duration to receive one of two adjacent unconnected T-Poll frames once the transceiver is tuned to the one of the channels.

6. The network node of claim 5, wherein the two adjacent unconnected T-Poll frames are separated by a poll interval including a poll frame transmission time (pMICSUnconnectedPollTxTime).

7. The network node of claim 5, wherein the two adjacent unconnected T-Poll frames are separated by a poll interval including an inter frame space (pSIFS).

8. The network node of claim 5, wherein the two adjacent unconnected T-Poll frames are separated by a poll interval including a frame preamble time (pMICSPreambleTxTime).

9. The network node of claim 5, wherein the two adjacent unconnected T-Poll frames are separated by a poll interval including a sum of a poll frame transmission time (pMICSUnconnectedPollTxTime) plus twice an inter frame space (pSIFS) plus a frame preamble time (pMICSPreambleTxTime).

10. A medical implantable device, comprising:
a transceiver;
a memory storing a list of channels; and
a processor coupled to the transceiver and the memory, and configured to
cyclically tune the transceiver to each of the channels stored in the memory for a listen period (pMICSUnconnectedPollRxTime) including a preamble transmission time (pMICSPreambleTxTime);
discover a network hub upon receiving a timed poll (T-Poll) frame from the network hub;
assign one of the channels at which the network hub is discovered as a current channel; and
stop cyclically tuning the transceiver to stay on the current channel.

11. The medical implantable device of claim 10, wherein the pMICSPreambleTxTime is 480 µs.

12. The medical implantable device of claim 10, wherein the processor is configured to transmit a management frame (M-Frame) to the network hub using the transceiver and via the current channel.

13. The medical implantable device of claim 10, wherein the pMICSUnconnectedPollRxTime is set at a duration to receive one of two adjacent unconnected T-Poll frames once the transceiver is tuned to the one of the channels.

14. The medical implantable device of claim 13, wherein the two adjacent unconnected T-Poll frames are separated by a poll interval including a poll frame transmission time (pMICSUnconnectedPollTxTime).

15. The medical implantable device of claim 13, wherein the two adjacent unconnected T-Poll frames are separated by a poll interval including an inter frame space (pSIFS).

16. The medical implantable device of claim 13, wherein the two adjacent unconnected T-Poll frames are separated by a poll interval including a frame preamble time (pMICSPreambleTxTime).

17. The medical implantable device of claim 13, wherein the two adjacent unconnected T-Poll frames are separated by a poll interval including a sum of a poll frame transmission time (pMICSUnconnectedPollTxTime) plus twice an inter frame space (pSIFS) plus a frame preamble time (pMICSPreambleTxTime).

18. A method, comprising:
storing channels and data associated with an operation; and
cyclically tuning a transceiver to each of the channels for a listen period (pMICSUnconnectedPollRxTime) including a preamble transmission time (pMICSPreambleTxTime);
discover a network hub upon receiving a timed poll (T-Poll) frame from the network hub;
assign the channel at which the network hub is discovered as a current channel; and
staying on the current channel upon the assigning.

19. The method of claim 18, further comprising:
transmitting a management frame (M-Frame) to the network hub using the transceiver and via the current channel.

20. The method of claim 18, wherein the pMICSUnconnectedPollRxTime is set at a duration to receive one of two adjacent unconnected T-Poll frames once the transceiver is tuned to the one of the channels.

21. The method of claim 20, wherein the two adjacent unconnected T-Poll frames are separated by a poll interval including a poll frame transmission time (pMICSUnconnectedPollTxTime).

22. The method of claim 20, wherein the two adjacent unconnected T-Poll frames are separated by a poll interval including an inter frame space (pSIFS).

23. The method of claim 20, wherein the two adjacent unconnected T-Poll frames are separated by a poll interval including a frame preamble time (pMICSPreambleTxTime).

24. The method of claim 20, wherein the two adjacent unconnected T-Poll frames are separated by a poll interval including a sum of a poll frame transmission time (pMIC-SUnconnectedPollTxTime) plus twice an inter frame space (pSIFS) plus a frame preamble time (pMICSPreambleTx-Time).

\* \* \* \* \*